United States Patent
Deshpande et al.

(10) Patent No.: US 10,411,977 B2
(45) Date of Patent: *Sep. 10, 2019

(54) VISUALIZATION OF WORKLOAD DISTRIBUTION ON SERVER RESOURCES

(71) Applicant: International Business Machines Corporation, Armonk, NY (US)

(72) Inventors: Deepak A. Deshpande, Pune (IN); Venkata R. Somisetty, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/475,620

(22) Filed: Sep. 3, 2014

(65) Prior Publication Data

US 2015/0032897 A1 Jan. 29, 2015

Related U.S. Application Data

(63) Continuation of application No. 13/951,622, filed on Jul. 26, 2013.

(51) Int. Cl.
*H04L 12/26* (2006.01)
*H04L 12/911* (2013.01)

(52) U.S. Cl.
CPC ........ *H04L 43/045* (2013.01); *H04L 43/0817* (2013.01); *H04L 47/70* (2013.01)

(58) Field of Classification Search
CPC ................................ H04L 47/70; H04L 43/08

(Continued)

(56) References Cited

U.S. PATENT DOCUMENTS 6,985,937 B1 * 1/2006 Keshav ................. G06F 9/5077
                                                                    370/231
7,243,145 B1 * 7/2007 Poortman ..................... 709/223
(Continued)

FOREIGN PATENT DOCUMENTS

WO    2013023302 A1    2/2013

OTHER PUBLICATIONS

Mahambre et al., "Workload Characterization for Capacity Planning and Performance Management in IaaS Cloud", 78-1-4673-4422-7/12/$31.00©2012 IEEE,.

(Continued)

*Primary Examiner* — Nicholas R Taylor
*Assistant Examiner* — Meng Vang
(74) *Attorney, Agent, or Firm* — Isaac J. Gooshaw (57) ABSTRACT

Embodiments of the present invention disclose a method, computer program product, and system for visualization of workload distribution on server resources. A computer identifies a profile, wherein the profile corresponds to a role of an individual associated with one or more servers. The computer identifies data that includes a degree of resource utilization that corresponds to the identified profile. The computer generates a visualization of the identified data that includes the degree of resource utilization that corresponds to the identified profile, wherein the visualization includes depictions of resource utilization, distribution of a workload deployed on the one or more servers, and total quantity of available resources of the one or more servers. In another embodiment, the computer initiates display of the generated visualization of the identified data that includes the degree of resource utilization that corresponds to the determined profile.

7 Claims, 3 Drawing Sheets

(58) Field of Classification Search
USPC .................................................. 709/226, 225
See application file for complete search history.

(56) References Cited

U.S. PATENT DOCUMENTS

| | | | |
|---|---|---|---|
| 7,581,224 B2* | 8/2009 | Romero | 718/104 |
| 8,327,373 B2 | 12/2012 | Srinivasan | |
| 8,549,530 B1* | 10/2013 | Bullock | G06F 9/5033 718/102 |
| 2004/0267897 A1* | 12/2004 | Hill et al. | 709/217 |
| 2005/0060590 A1* | 3/2005 | Bradley | G06F 1/3203 713/320 |
| 2006/0026179 A1* | 2/2006 | Brown | G06F 17/30306 |
| 2008/0270595 A1 | 10/2008 | Rolia et al. | |
| 2010/0185961 A1* | 7/2010 | Fisher et al. | 715/760 |
| 2011/0219118 A1* | 9/2011 | Cowan et al. | 709/224 |
| 2011/0270968 A1* | 11/2011 | Salsburg | G06F 9/5072 709/224 |
| 2012/0159476 A1 | 6/2012 | Ramteke et al. | |
| 2012/0166642 A1* | 6/2012 | Saint Clair et al. | 709/225 |
| 2012/0233626 A1 | 9/2012 | Hoffman et al. | |
| 2012/0284408 A1 | 11/2012 | Dutta et al. | |
| 2012/0311154 A1* | 12/2012 | Morgan | H04L 12/6418 709/226 |
| 2013/0067378 A1* | 3/2013 | Au et al. | 715/771 |
| 2013/0305242 A1* | 11/2013 | Wang | G06F 9/45558 718/1 |

OTHER PUBLICATIONS

Oktay et al., "Risk-Aware Workload Distribution in Hybrid Clouds", 2012 IEEE Fifth International Conference on Cloud Computing, 978-0-7695-4755-8/12 $26.00 © 2012 IEEE, DOI 10.1109/CLOUD. 2012.128, pp. 229-236.

Wang et al., "Impact of Cloud Computing Virtualization Strategies on Workloads' Performance".

"System and Apparatus for deploying workloads in Cloud based on Application Type and workloads relationships", IP.com No. IPCOM000206917D IP.com, Electronic Publication: May 13, 2011.

Dave Pacheco's Blog, <http://dtrace.org/blogs/dap/2011/03/01/welcome-to-cloud-analytics/>, printed on Apr. 12, 2013.

U.S. Appl. No. 13/951,622, entitled "Visualization of Workload Distribution on Server Resources" filed Jul. 26, 2013.

* cited by examiner

VISUALIZATION OF WORKLOAD DISTRIBUTION ON SERVER RESOURCES

FIELD OF THE INVENTION

The present invention relates generally to the field of resource management, and more particularly to visualization of workload distribution on server resources.

BACKGROUND OF THE INVENTION

A cloud computing environment is composed of a plurality of server computers, computing devices and storage devices. Workloads are deployed into the cloud environment and are executed by the by the various elements of the cloud environment. Server computers are composed of resources (e.g., memory, Central Processing Units (CPUs), storage devices, and I/O devices) that are used to execute workloads deployed in a cloud environment. Virtual machines are software implemented abstractions of the underlying resources of server computers, and can be utilized to emulate functions of a physical computer (e.g., execute programs). A Logical partition (LPAR) can be utilized to allocate resources of a server computer (e.g., memory, Central Processing Units (CPUs), storage devices, and I/O devices) to virtual machines for utilization in executing deployed workloads. In a cloud computing environment, the workloads that are deployed into the environment can be executed by the server computers of the cloud computing environment, and corresponding virtual machines of server computers.

SUMMARY

Embodiments of the present invention disclose a method, computer program product, and system for visualization of workload distribution on server resources. A computer identifies a profile, wherein the profile corresponds to a role of an individual associated with one or more servers. The computer identifies data that includes a degree of resource utilization that corresponds to the identified profile. The computer generates a visualization of the identified data that includes the degree of resource utilization that corresponds to the identified profile, wherein the visualization includes depictions of resource utilization, distribution of a workload deployed on the one or more servers, and total quantity of available resources of the one or more servers. In another embodiment, the computer initiates display of the generated visualization of the identified data that includes the degree of resource utilization that corresponds to the determined profile.

DETAILED DESCRIPTION

Exemplary embodiments of the present invention allow for display of a visualization of resource utilization corresponding to server computers in a cloud environment. In one embodiment, a visualization is determined that consists of resources that are relevant to an associated profile of an individual. Visualizations can be customized and utilized to determine additional workloads that can be deployed on servers in the cloud environment.

Embodiments of the present invention recognize that in a large cloud environment, workloads are distributed between many servers within the cloud environment. Based upon utilization and resource capacity of servers, some spare capacity can exist within the cloud environment. Spare capacity can be in the form of unused CPU cycles, memory, and network and I/O bandwidth. For optimal usage of the cloud environment, additional workloads can be deployed in the cloud environment that utilize the spare capacity within the servers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
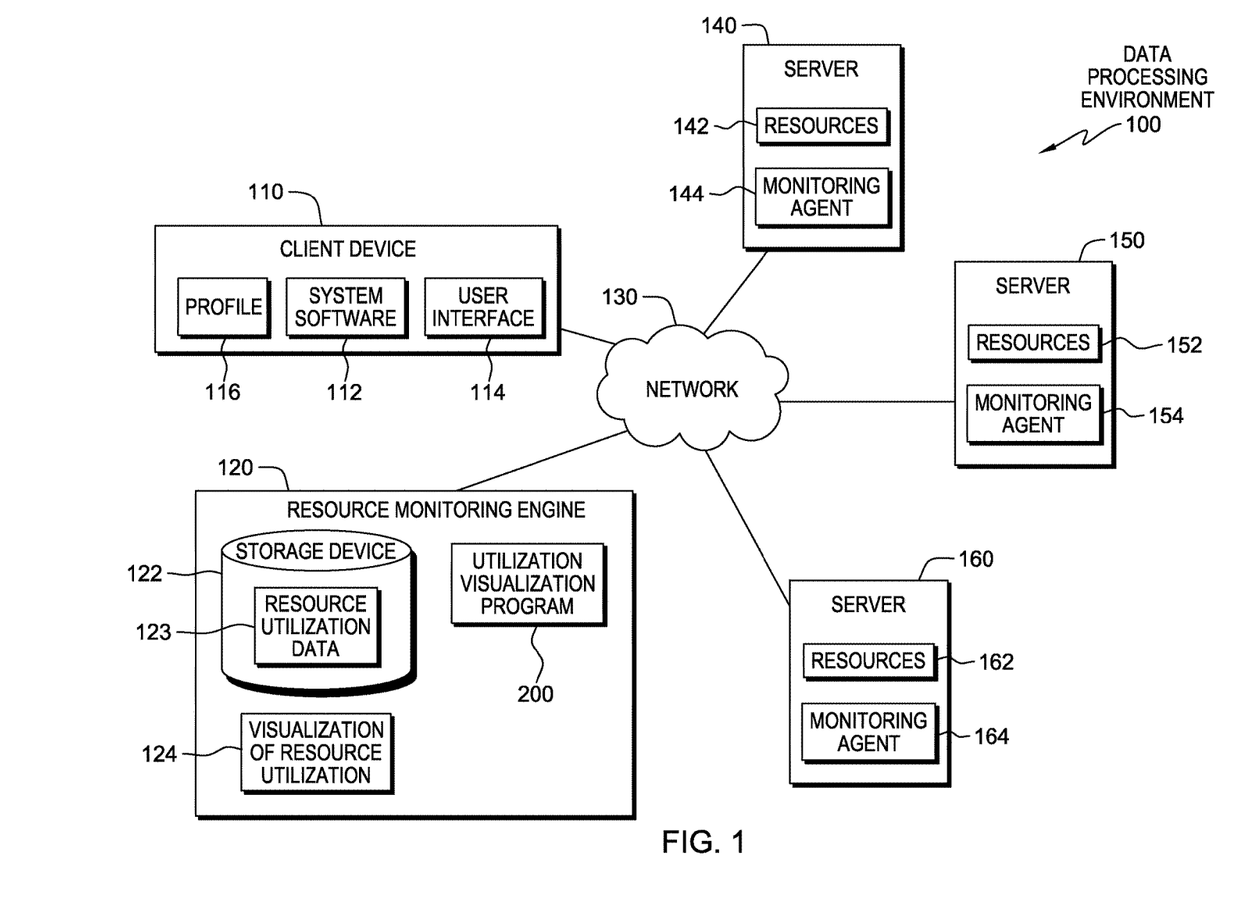
FIG. 1 in a functional block diagram of a data processing environment, in accordance with an embodiment of the present invention.

The present invention will now be described in detail with reference to the Figures. FIG. 1 is a functional block diagram illustrating data processing environment, 100, in accordance with one embodiment of the present invention.

An exemplary embodiment of data processing environment 100 includes client device 110, resource monitoring engine 120, network 130, and server 140, 150 and 160. In one embodiment, data processing environment 100 can be representative of client device 110 and a cloud computing environment that includes resource monitoring engine 120, network 130, and server 140, 150 and 160.

A user of client device 110 can access resource monitoring engine 120 through network 130 to retrieve information corresponding to server 140, 150 and 160. In exemplary embodiments, client device 110 can be utilized by individuals of differing profiles (i.e. roles within a cloud environment) to receive data corresponding to the utilization of server 140, 150 and 160. In various embodiments of the present invention, client device 110 may be a workstation, personal computer, personal digital assistant, mobile phone, or any other device capable of executing program instructions. In general, client device 110 is representative of any electronic device or combination of electronic devices capable of executing machine-readable program instructions, as described in greater detail with regard to FIG. 3. Client device 110 includes systems software 112, user interface 114, and profile 116. In one embodiment, system software 112 may exist in the form of operating system software, which may be Windows®, LINUX®, and other application software such as internet applications and web browsers. User interface 114 allows a user of client device 110 to input information into client device 110. Profile 116 indicates the role of the user of client device 110 (i.e. role within data processing environment 100).

Resource monitoring engine 120 includes storage device 122, visualization of resource utilization 124, and utilization visualization program 200. In one embodiment, resource monitoring engine 120 receives data from server 140, 150 and 160, which is associated with the utilization of resources (i.e. resources 142, 152 and 162) through network 130. In exemplary embodiments, resource monitoring engine 120 can be a desktop computer, computer server, or any other computer system known in the art. In certain embodiments, resource monitoring engine 120 represents a computer system utilizing clustered computers and components (e.g., database server computers, application server computers, etc.) that act as a single pool of seamless resources when accessed by elements of data processing environment 100 (e.g., client device 110). In general, resource monitoring engine 120 is representative of any electronic device or combination of electronic devices capable of executing machine-readable program instructions, as described in greater detail with regard to FIG. 3.

Storage device 122 stores data that resource monitoring engine 120 receives from monitoring agent 144, 154 and 164 respectively located on server 140, 150 and 160. In one embodiment, storage device 122 stores workloads associated with server 140, 150 and 160, utilization of resources 142, 152 and 162 corresponding to the workloads (i.e. resource utilization data 123), and which data is associated with profile 116 of a user of client device 110. Individuals associated with a cloud environment have different profiles (i.e. profile 116 corresponding to roles) within the cloud environment, which indicate an association with different types of relevant data. Storage device 122 can be implemented with any type of storage device that is capable of storing data that may be accessed and utilized by resource monitoring engine 120, such as a database server, a hard disk drive, or flash memory. In other embodiments, storage device 122 can represent multiple storage devices within resource monitoring engine 120. In exemplary embodiments, utilization visualization program 200 determines a visualization of resource utilization (i.e. visualization of resource utilization 124) of server 140, 150 and 160 corresponding to an individuals associated profile (i.e. profile 116). For example, visualization of resource utilization 124 can include charts, data tables and graphical depictions that are populated with data from storage device 122 corresponding to resource utilization data 123 of resources 142, 152 and 162, which relate to profile 116 of the user of client device 110. Utilization visualization program 200 is discussed in greater detail with regards to FIG. 2.

In one embodiment, client device 110, resource monitoring engine 120, and server 140, 150 and 160 communicate through network 130. Network 130 can be, for example, a local area network (LAN), a telecommunications network, a wide area network (WAN) such as the Internet, or a combination of the three, and include wired, wireless, or fiber optic connections. In general, network 130 can be any combination of connections and protocols that will support communications between client device 110, resource monitoring engine 120, and server 140, 150 and 160 in accordance with exemplary embodiments of the present invention.

Server 140, 150 and 160 include respective instances of resources 142, 152 and 162, and monitoring agent 144, 154 and 164. In exemplary embodiments, server 140, 150 and 160 are part of a cloud computing environment and are utilized to execute workloads. In exemplary embodiments, server 140, 150 and 160 can be desktop computers, computer servers, or any other computer systems known in the art. In certain embodiments, server 140, 150 and 160 represent computer systems utilizing clustered computers and components (e.g., database server computers, application server computers, etc.) that act as a single pool of seamless resources when accessed by elements of data processing environment 100 (e.g., resource monitoring engine 120). In general, server 140, 150 and 160 are representative of any electronic device or combination of electronic devices capable of executing machine-readable program instructions, as described in greater detail with regard to FIG. 3. In exemplary embodiments, server 140, 150 and 160 include applications utilizing resources 142, 152 and 162 that are associated with workloads implemented on server 140, 150 and 160 (e.g., human resources applications, payroll applications, email applications, etc.).

Resources 142, 152 and 162 are representations of resources (e.g., memory, CPUs, storage devices, and I/O devices) that are utilized by respective instances of server 140, 150 and 160. Workloads that are deployed in a cloud environment utilize resources 142, 152 and 162 of server 140, 150 and 160. In another embodiment, resources 142, 152 and 162 can be allocated (e.g., Logical partition (LPAR)) to virtual machines within server 140, 150 and 160. Virtual machines are software implemented abstractions of hardware of server 140, 150 and 160, and can be utilized to emulate functions of a physical computer (i.e. execute programs). In exemplary embodiments, virtual machines have corresponding resource allocations (e.g., memory, CPUs, storage devices and I/O devices) from server 140, 150 and 160, and can host applications utilized to execute certain workloads.

Monitoring agent 144, 154 and 164 collect data on respective server 140, 150 and 160 corresponding to the utilization of respective resources 142, 152 and 162, and sends the collected data to resource monitoring engine 120 through network 130. Data respectively collected by monitoring agent 144, 154 and 164 includes utilization of resources 142, 152 and 162 (e.g., CPU cycles, memory, I/O bandwidth) corresponding to workloads deployed on server 140, 150 and 160. In another embodiment, data collected by monitoring agent 144, 154 and 164 can include utilization of non-resource policies (e.g., business policies and technical policies). The data is sent to resource monitoring engine 120 for storage on storage device 122. In one embodiment, monitoring agent 144, 154 and 164 is a computer program executing on respective server 140, 150 and 160. For example, monitoring agent 144 collects utilization data from resources 142 (i.e. resource utilization data 123) corresponding to workloads deployed on server 140 utilizing resources 142. Resource utilization data 123, which is collected by monitoring agent 144 includes the degree of utilization of each resource of server 142 (e.g., a percentage) at a given time. Resource utilization data 123 also includes a limitation of the resource (e.g., the resource's capacity), which is associated with a deployed workload. In another embodiment, respective monitoring agent 144, 154 and 164 collect data on respective server 140, 150 and 160, which respectively correspond to virtual machines utilizing resources 142, 152 and 162 that are executing on server 140, 150 and 160. Data corresponding to the respective virtual machines include workloads deployed on these virtual machines, and usage characteristics of the virtual machines (e.g., utilization of resources 142, 152 and 162 corresponding to workloads deployed on virtual machines implemented on server 140, 150 and 160).

Figure 2:
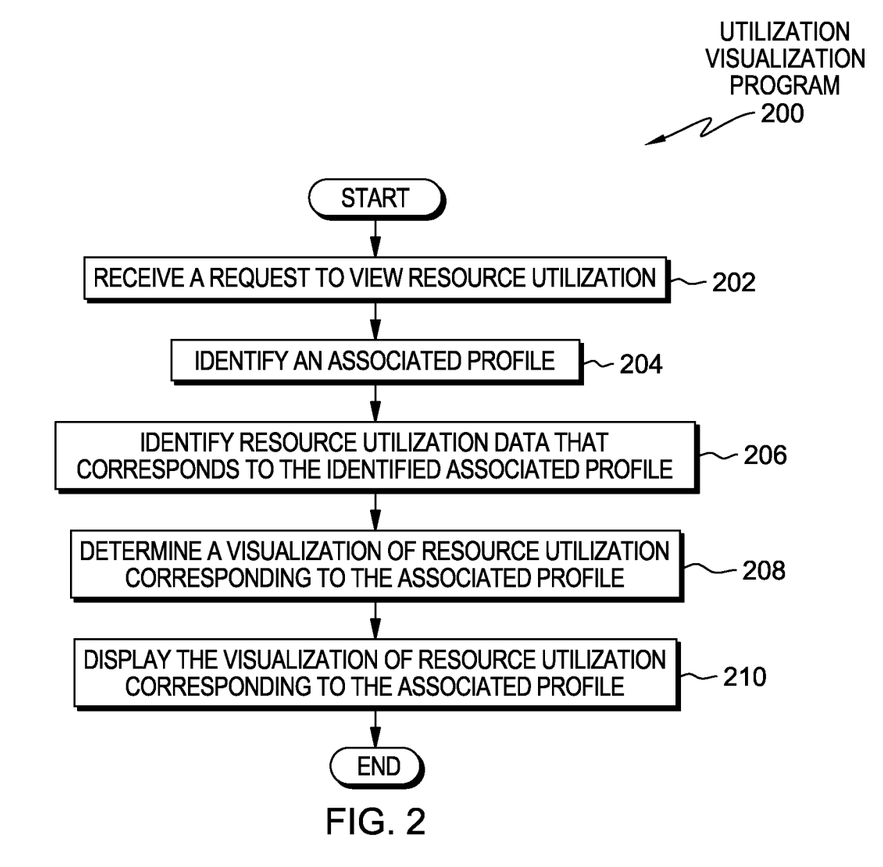
FIG. 2 is a flowchart depicting operational steps of a program for determining a visualization of resource utilization, in accordance with an embodiment of the present invention.

FIG. 2 is a flowchart depicting operational steps of utilization visualization program 200 in accordance with an exemplary embodiment of the present invention. In one embodiment, utilization visualization program 200 initiates when a user of client device 110 accesses resource monitoring engine 120 and requests to view resource utilization (i.e. resources 142, 152 and 162) of one or more server 140, 150 and 160.

In step 202, utilization visualization program 200 receives a request to view resource utilization. In one embodiment, utilization visualization program 200 receives a request from an individual (e.g., a user of client device 110) to view utilization of resources 142, 152 and 162 on server 140, 150 and 160. In an exemplary embodiment, a user of client device 110 accesses resource monitoring engine 120 and requests to view the utilization of resources 142, which are allocated to one or more virtual machines implemented on server 140.

In step 204, utilization visualization program 200 identifies an associated profile. In one embodiment, utilization visualization program 200 identifies profile 116 associated with the user of client device 110 to request to view resource utilization (from step 202). A profile of an individual (i.e. profile 116) indicates an individual's role associated to data processing environment 100 (e.g., network administrator, database administrator, etc). Profile 116 of the user of client device 110 can be automatically associated with the individual and provided to utilization visualization program 200 (e.g., associated with log in information), or utilization visualization program 200 can prompt the user of client device 110 to indicate profile 116. Profile 116 indicates which data is relevant to an individual, and can be included in visualization of resource utilization 124. An indication of which data is relevant to profile 116 of an individual is included in storage device 122. For example, a user of client device 110 has an associated profile 116 of a network administrator of a cloud environment, which indicates that data associated with the network of the cloud environment (e.g., network usage, network topology).

In step 206, utilization visualization program 200 identifies resource utilization data that corresponds to the identified associated profile. In one embodiment, utilization visualization program 200 identifies resource utilization data 123 that is stored in storage device 122 that corresponds to profile 116 associated with the user of client device 110 (identified in step 204). In exemplary embodiments, storage device 122 stores utilization data of resources 142, 152 and 162 (i.e. resource utilization data 123), and which profiles resource utilization data 123 is associated with. Storage device 122 includes utilization data received of resources 142, 152 and 162 from monitoring agent 144, 154 and 164 (i.e. resource utilization data 123, and which workloads are associated with resource utilization data 123. Utilization visualization program 200 identifies resource utilization data 123 in storage device 122 that corresponds to profile 116 of an individual, and therefore is relevant to the individual.

In step 208, utilization visualization program 200 determines a visualization of resource utilization corresponding to the associated profile. In one embodiment, utilization visualization program 200 determines visualization of resource utilization 124, which includes resource utilization data 123 corresponding to profile 116 associated with the user of client device 110 (from step 206). In exemplary embodiments, the visualization can include charts, data tables and graphical depictions that are populated with data from storage device 122 corresponding to resource utilization data 123 of resources 142, 152 and 162, which relate to profile 116 of the user of client device 110. Visualization of the resource utilization 124 indicates how server 140, 150 and 160 execute the workload distribution. In exemplary embodiments, the visualization can include a correlation between data included charts, data tables and graphical depictions in the visualization. For example, a human resources application on server 140 shows an increase in CPU usage in resources 142, and at the same time a payroll application on server 150 shows an increase in network usage in resources 152. Correlation between data in the visualization allows a user of client device 110 to see how an increase (and possible overutilization) of a certain resource relates utilization of other resources.

In a first example, an individual with a profile (i.e. profile 116) associated with memory resources of server 140, 150 and 160 in a cloud computing environment (e.g., a storage administrator) utilizes client device 110 to access resource monitoring engine 120 to view the utilization of server 140, 150 and 160. Utilization visualization program 200 identifies resource utilization data 123, which corresponds to the storage administrator profile and determines a visualization of the utilization of memory in resources 142, 152 and 162 with resource utilization data 123 gathered by monitoring agent 144, 154 and 164 that is stored in storage device 122. In exemplary embodiments, the visualization includes charts, data tables and graphs that depict utilization of memory in resources 142, 152 and 162 relative to the total available memory, and an amount of memory that is not being utilized. The data in visualization of resource utilization 124 can include, but is not limited to charts, data tables and graphical depictions indicating utilization of the resource in comparison to the limitation of the resource, workloads deployed that utilize the resource, the total amount of the resource, amount of the resource that is being utilized, amount of the resource that is not being utilized (spare), and an indication of a server the resource is located on. In one embodiment, utilization visualization program 200 determines a visualization of the current resource utilization of resources 142, 152 and 162 (i.e. visualization of resource utilization 124). The determined visualization of resource utilization 124 allows the user of client device 110 to view resources 142, 152 and 162 of server 140, 150 and 160 that are executing workloads that are deployed on server 140, 150 and 160.

In step 210, utilization visualization program 200 displays the visualization of resource utilization corresponding to the associated profile. In one embodiment, utilization visualization program 200 displays visualization of resource utilization 124 (determined in step 208) to the user of client device 110 that requested to view resource utilization (in step 202). In exemplary embodiments, visualization of resource utilization 124 corresponds to the associated profile 116, and is the default visualization for the user of client device 110. Utilization visualization program 200 allows for customization of visualization of resource utilization 124 (determined in step 208), which can include, but is not limited to determining different resources to include in the visualization (e.g., resources not associated with an individuals profile), and applying filters to data in the visualization. In continuation of the example of the storage administrator of the cloud computing environment, the displayed visualization of memory utilization of server 140, 150 and 160 allows the storage administrator to see where additional workloads can be deployed. Unused resource capacity of respective resources 142, 152 and 162 are displayed in visualization of resource utilization 124 to indicate that there is resource capacity that can be utilized for additional workloads, which leads to an increased efficiency for utilization of server 140, 150 and 160.

In another embodiment, a user of client device 110 performs a what-if analysis to determine whether additional workloads can be deployed on server 140, 150 and 160. A what-if analysis utilizes historical data (in storage device 122) to forecast future workloads on server 140, 150 and 160, and allows a user of client device 110 to model different scenarios (e.g., at a workload level) and view the impact of deployed workloads on relationships between resources 142, 152 and 162. For example, a user of client device 110 can utilize a what-if analysis in a visualization to determine workloads that can be deployed on server 140, 150 and 160. Historical workloads can be utilized to project future workloads of server 140, 150 and 160 (e.g., historical workloads that are scheduled can repeat as future workloads). Projections and predictions of workloads and relationships to resources can be included in a visualization utilizing what-if analysis, or other methods of determining predictions. Visualization of resource utilization 124 automatically updates responsive to data that resource monitoring engine 120 receives from monitoring agent 144, 154 and 164 so that the visualization depicts the current utilization of resources 142, 152 and 142. In exemplary embodiments, resource utilization data 123 included in visualization of resource utilization 124 can include data collected by monitoring agent 144, 154 and 164 corresponding to utilization of non-resource policies (e.g., business policies and technical policies) of server 140, 150 and 160.

Figure 3:
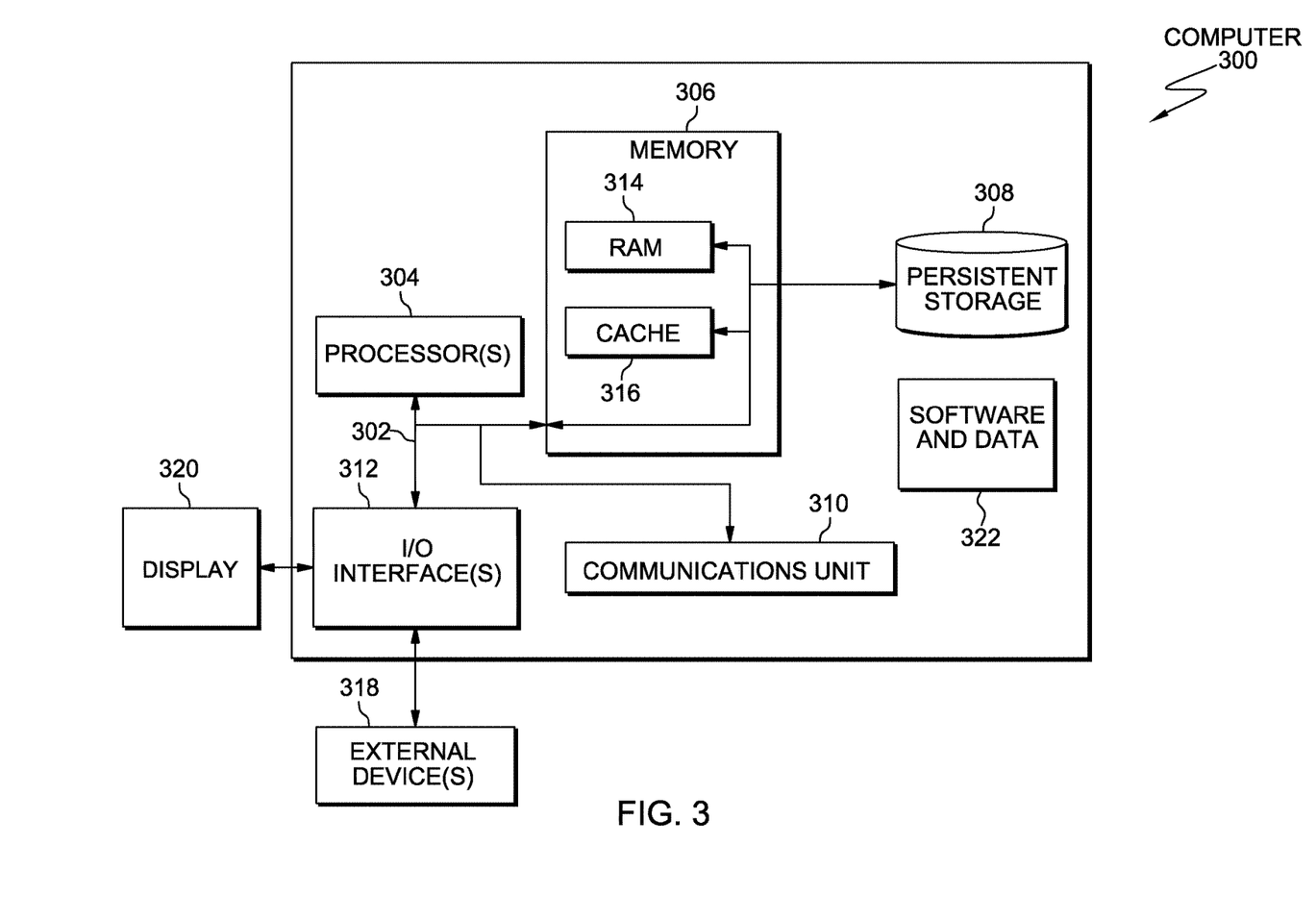
FIG. 3 depicts a block diagram of components of the computing system of FIG. 1, in accordance with an embodiment of the present invention.

FIG. 3 depicts a block diagram of components computer 300, which is representative of client device 110, resource monitoring engine 120, and server 140, 150 and 160 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media. Software and data 322 stored in persistent storage 308 for access and/or execution by processors 304 via one or more memories of memory 306. With respect to client device 110, software and data 322 represents system software 112. With respect to resource monitoring engine 120, software and data 322 represents utilization visualization program 200. With respect to server 140, 150 and 160, software and data 322 represents respective instances of monitoring agent 144, 154 and 164.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data 322 can be stored on such portable computer-readable storage media and can be loaded onto persistent storage 308 via I/O interface(s) 312. I/O interface(s) 312 also can connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for visualization of workload distribution on server resources, the method comprising:
   a computer receiving, from a client device, a request to view a resource utilization for a set of virtual machines on a server, wherein the server acts as a single pool of seamless resources;
   the computer identifying a profile based on the client device and a set of log in information, wherein the profile corresponds to a role of an individual associated with the server;
   the computer identifying data that includes a degree of current resource utilization of the server corresponding to the identified profile, based at least in part on the role of the individual, wherein:
   the data includes at least a set of central processing unit cycles and an input/output bandwidth;
   the data is stored on a storage device, and
   the data is collected from a set of monitoring agents;
   the computer generating a visualization of the identified data that includes the degree of current resource utilization that corresponds to the identified profile, wherein the visualization includes:
   depictions of resource utilization including at least a data table and a chart,
   distribution of a workload deployed on the server,
   how the server execute the workload, and
   total quantity of available resources of the server;
   the computer determining, based at least in part on a what-if analysis of a set of historical data on the storage device to increase the degree of current resource utilization of the server, an additional workload that can be deployed on the server, wherein the what-if analysis models a workload level; and
   the computer allocating the additional workload to the server, wherein the allocated additional workload increases degree of current the resource utilization of the server.

2. The method of claim 1, further comprising:
   the computer initiating display of the generated visualization of the identified data that includes the degree of current resource utilization that corresponds to the identified profile.

3. The method of claim 1, wherein the data that includes the degree of current resource utilization selected from the group consisting of:
   a degree of utilization of one or more resources of the server,
   a total quantity available of each of the one or more resources,
   one or more workloads deployed on the server,
   the resources being utilized by the respective one or more workloads, and
   a correlation between an increase of a first resource of the one or more resources relates to utilization of other resources of the one or more resources.

4. The method of claim 1, wherein generating the visualization of the identified data that includes the degree of current resource utilization that corresponds to the identified profile comprises:

the computer generating graphical depictions and data tables of the identified data that includes the degree of current resource utilization that corresponds to the identified profile; and the computer determining respective total quantities of available resources of the server utilizing the identified data that includes the degree of current resource utilization corresponding to the identified profile.

5. The method of claim 2, wherein the display of the generated visualization of the identified data that includes the degree of current resource utilization that corresponds to the identified profile includes a user interface allowing customization of the visualization.

6. The method of claim 1, wherein the resources include:

memory, network bandwidth, and business and technical policies.

7. The method of claim 1, wherein the server is part of a cloud computing environment.

\* \* \* \* \*